(12) United States Patent
Fox

(10) Patent No.: US 8,919,475 B2
(45) Date of Patent: Dec. 30, 2014

(54) GROUND EFFECT LOAD TRANSPORTATION

(75) Inventor: Jeremy W. Fox, Salford (GB)

(73) Assignee: Kallista Properties Limited, Salford (GB)

( * ) Notice: Subject to any disclaimer, the term of this patent is extended or adjusted under 35 U.S.C. 154(b) by 386 days.

(21) Appl. No.: 13/024,082

(22) Filed: Feb. 9, 2011

(65) Prior Publication Data

US 2011/0192664 A1    Aug. 11, 2011

(30) Foreign Application Priority Data

Feb. 10, 2010 (GB) .................................. 1002269.7
Apr. 1, 2010 (GB) .................................. 1005613.3

(51) Int. Cl.
| | | |
|---|---|---|
| *B60V 1/02* | (2006.01) | |
| *B60V 1/06* | (2006.01) | |
| *B60V 1/16* | (2006.01) | |
| *B60V 3/02* | (2006.01) | |

(52) U.S. Cl.
CPC .... *B60V 3/02* (2013.01); *B60V 1/16* (2013.01)
USPC ............................ 180/129; 180/125; 180/127

(58) Field of Classification Search
CPC ............... B60V 1/16; B60V 1/06; B60V 3/02
USPC ................. 180/116, 128; 280/432, 768, 849; 296/180.4, 180.1
See application file for complete search history.

(56) References Cited

U.S. PATENT DOCUMENTS

| | | | | |
|---|---|---|---|---|
| 4,601,508 A | * | 7/1986 | Kerian | 296/180.4 |
| 2008/0303309 A1 | * | 12/2008 | Dayton | 296/180.1 |
| 2010/0264690 A1 | * | 10/2010 | Brown et al. | 296/180.4 |

FOREIGN PATENT DOCUMENTS

| | | | |
|---|---|---|---|
| GB | 1065574 A | | 4/1967 |
| GB | 1300978 A | | 12/1972 |
| GB | 1300978 A | * | 12/1972 |
| GB | 1342326 A | | 1/1974 |
| GB | 1423656 A | * | 2/1976 |
| GB | 1423656 A | | 2/1976 |
| GB | 2083425 A | | 3/1982 |
| GB | 2447852 A | | 10/2008 |
| RU | 2143982 C1 | | 1/2000 |
| WO | WO-2004094210 | | 11/2004 |

OTHER PUBLICATIONS

International Search Report of PCT/GB2011/000168.
Written Opinion of the International Searching Authority—PCT/GB2011/000168.
UK Office Search Report in International Application No. 681005613.3, mailed Jul. 22, 2010.

* cited by examiner

*Primary Examiner* — Joseph M Rocca
*Assistant Examiner* — Jacob Knutson
(74) *Attorney, Agent, or Firm* — Edwards Wildman Palmer LLP; Howard M. Gitten

(57) ABSTRACT

A ground effect transport system comprising a plenum roof platform for location beneath a load carrying means, a skirt depending from the platform to form a plenum chamber with the platform, fan means on or in the platform for supplying air to the plenum chamber, wherein the skirt extends downwardly towards the ground surface and has a ground engaging support member for supporting the bottom of the skirt above the ground surface and a separate detachable sealing member for providing a seal between the bottom of the skirt and the ground surface.

21 Claims, 8 Drawing Sheets

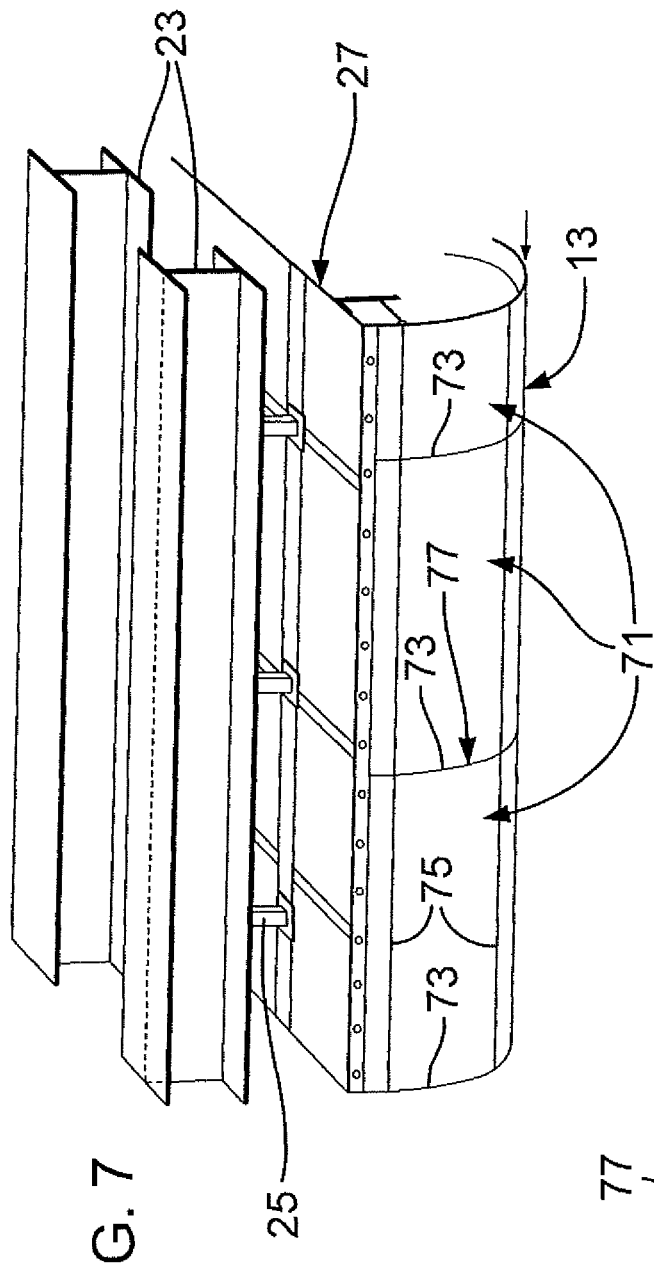
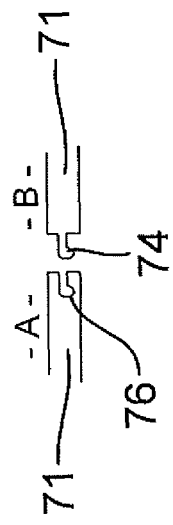
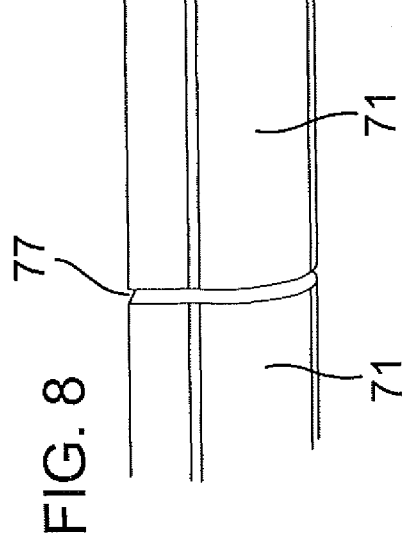

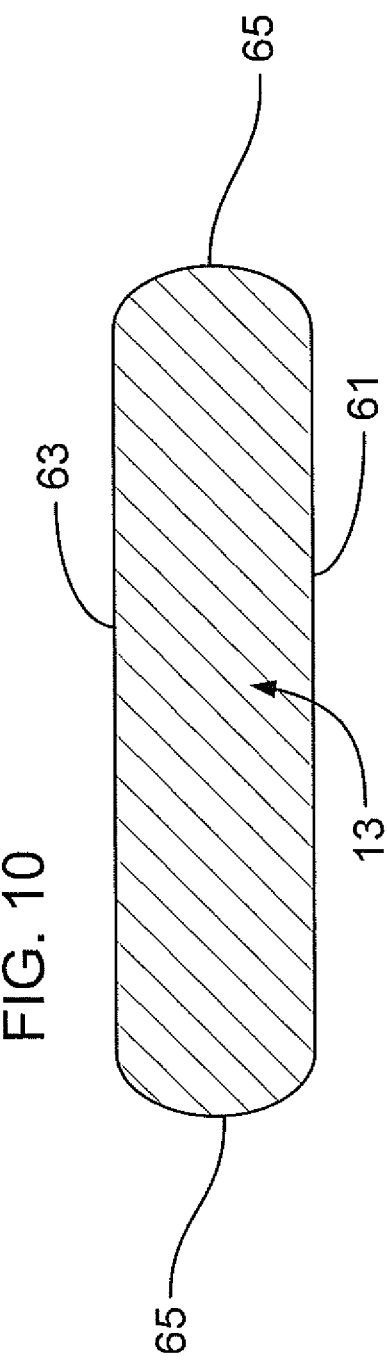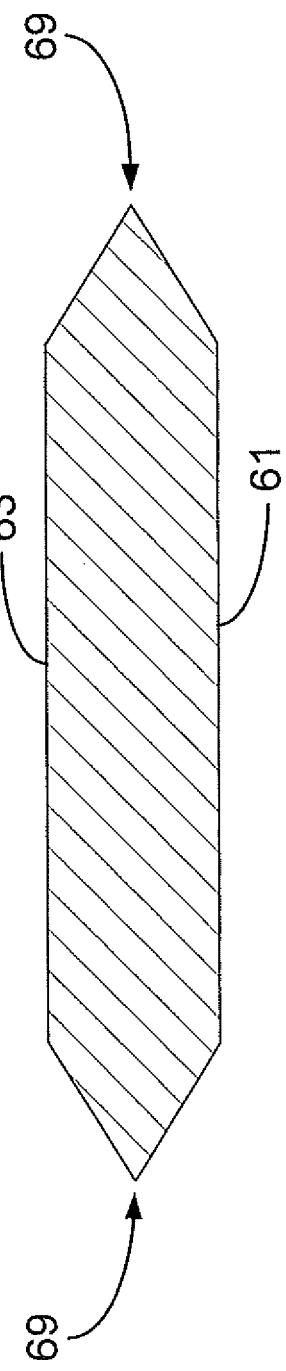

GROUND EFFECT LOAD TRANSPORTATION

CROSS-REFERENCE TO RELATED APPLICATION

This application claims priority to United Kingdom Application No. 1005613.3 filed on Apr. 1, 2010, and United Kingdom Application No., 1002269.7 filed on Feb. 10, 2010. The entire contents of the aforementioned patent applications are incorporated herein by these references.

FIELD OF THE INVENTION

This invention relates to load transportation by means of vehicles using ground effect to support part of the load.

BACKGROUND OF THE INVENTION

There have been a number of proposals for easing the load on goods vehicles by taking up a large part of the load using ground effect with a skirt. However, these have had problems due to excessive escape of air from underneath the lower edges of the skirt which has necessitated the use of excessive air supplies in order to maintain the air cushion and provide sufficient support for the load. Other problems include significant wear of the base region of the skirt and some wear effects on the road. The present invention seeks to obviate or reduce these above disadvantages.

BRIEF SUMMARY OF THE INVENTION

According to the invention, a ground effect transport system comprising a plenum roof platform for location beneath a load carrying means, a skirt depending from the platform to form a plenum chamber with the platform, fan means on or in the platform for supplying air to the plenum chamber, wherein the skirt extends downwardly towards the ground surface and has a ground engaging support member for supporting the bottom of the skirt above the ground surface and a separate detachable sealing member for providing a seal between the bottom of the skirt and the ground surface. The detachable sealing member may be located at an inner side of the support member and may comprise a sealing part in contact with the ground surface and an attachment part detachably attached to the skirt and attached to the sealing part by a hinge whose axis extends in the longitudinal direction of the skirt.

The ground engaging support member may comprise a brush surface. The brush surface may be formed on a base element which is fastened to the base of the skirt. The base element may be detachable from the skirt to enable replacement of the brush surface when worn.

The brush surface may comprise a large number of downwardly extending flexible bristles which may be PBT. Polyester, PVC or nylon. The bristles may be of a length ranging from 20 to 30 mm and may be angled backwards from the intended direction of travel of the load. The angle of inclination of the bristles may be equal to or less than 30 degrees to the vertical.

BRIEF DESCRIPTION OF THE DRAWINGS

The invention will now be described in greater detail by way of example; with reference to the drawings, in which:

FIG. 7 is a perspective view showing joints in the connection between adjacent sections of skirt and the attachment of the plenum chamber to the vehicle;

FIG. 8 is an enlarged view of showing a section joint shown in FIG. 7;

FIG. 9 is a sectional view through a section joint as shown in FIGS. 7 and 8;

FIG. 10 is a plan view of the footprint of a first embodiment of the skirt;

FIG. 11 is a plan view of the footprint of a second embodiment of the skirt;

DESCRIPTION OF THE PREFERRED EMBODIMENTS

Figure 1:
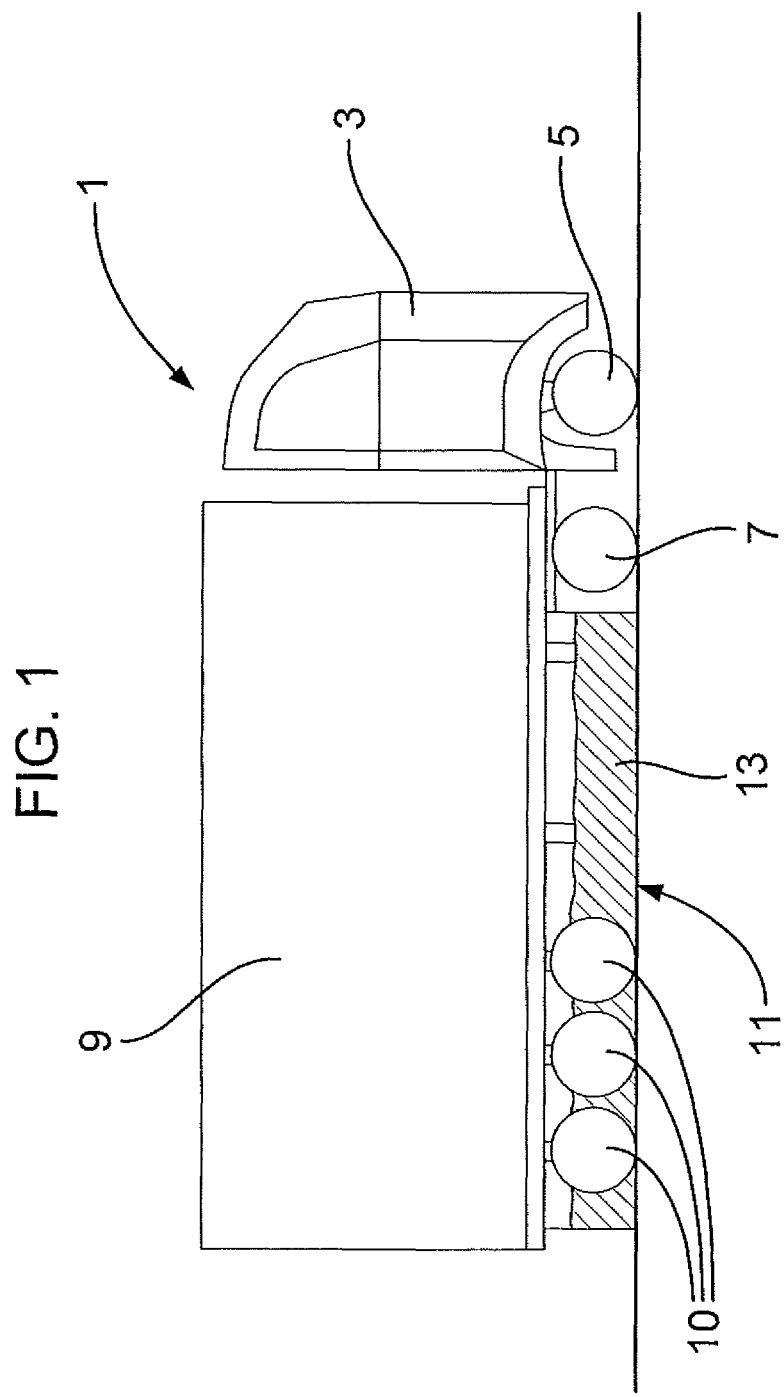
FIG. 1 is a general schematic side view of a vehicle in accordance with one embodiment of the invention.

Referring firstly to FIG. 1, there is shown schematically a vehicle 1 to which the invention is applied. The vehicle shown is a semi-trailer which is a vehicle having a cab unit 3 which is self contained and is supported on the ground by two steerable front wheels 5 and four trailing wheels 7 at the rear. The trailer portion 9 in this case is, for transit purposes, supported at its rear by wheels 10 and by a plenum chamber 11 defined in part by a skirt 13 and at its front end by the rear wheels 7 of the cab unit 3 over which the front end of the trailer extends.

The arrangements so far described are known. However, as has been mentioned above, the previous proposals have never been very satisfactory because of excessive escape of air from the plenum chamber due, to a large extent, to the construction of the plenum chamber and particularly of the skirt.

Figure 2:
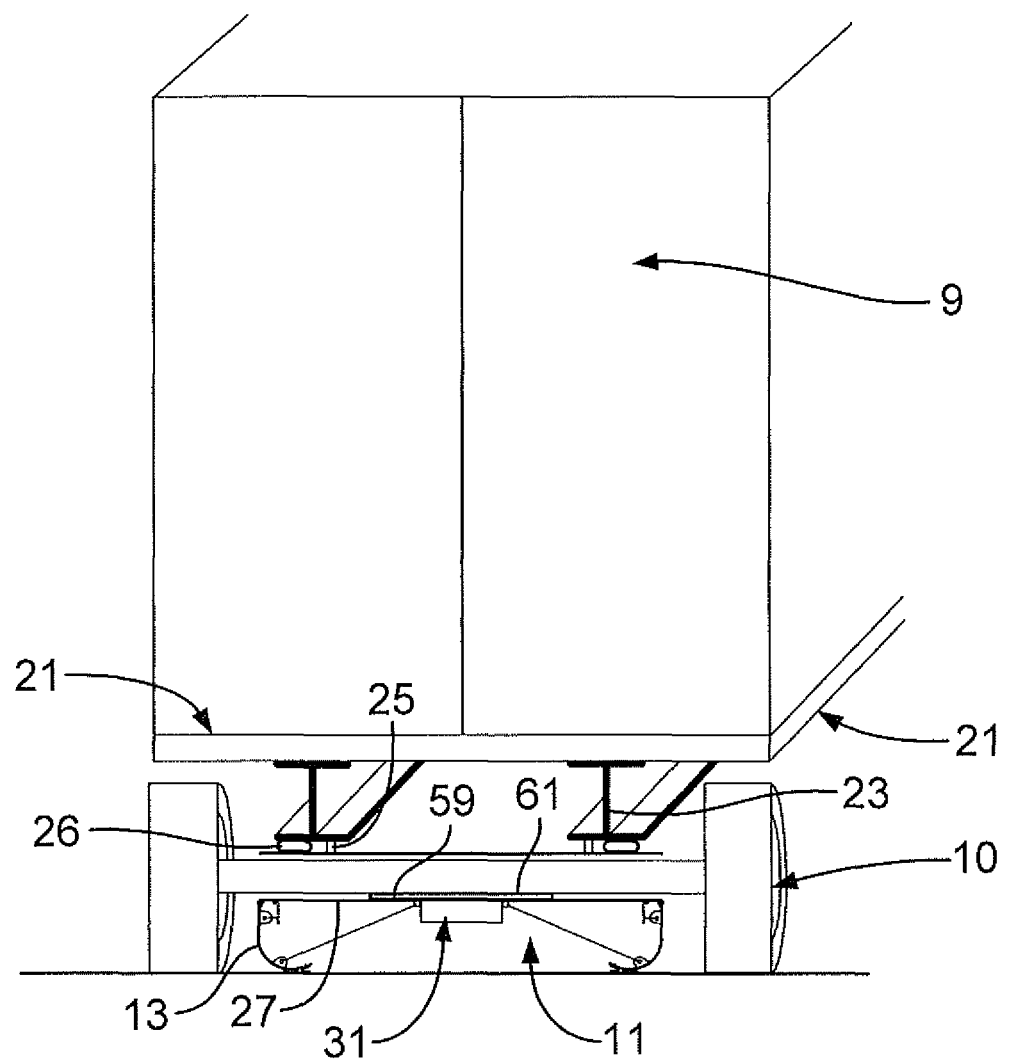
FIG. 2 is a rear view of the trailer of a semi-trailer for the vehicle shown in FIG. 1 with the support framework for the skirt shown and the details of the wheel arrangements removed.

The application of the invention to the above described semi-trailer vehicle will now be discussed in connection with FIGS. 2 to 4. Looking first at FIG. 2, there is shown a rear view of the trailer 9 of the semi-trailer 1. In this figure, the skirt arrangement is sectioned so as to indicate how the skirt is located.

Thus, the trailer 9 comprises a load carrying platform 21 which is basically supported towards its rear end by the six wheels 10 and at its forward end, when not connected to a cab unit 3 (FIG. 1) by means of loading legs (not shown), When attachment is made to the cab unit 3, the trailer 9 is connected as usual to the cab unit 3 by means of a king pin. In this situation, the landing legs are folded up towards the load supporting platform 21.

Attached to the loading platform 21 and depending thereebeneath is a framework comprising two longitudinally extending "I" beams 23 from which the plenum chamber 11 is suspended by a pair of suspension connectors 25 (FIG. 7). As can clearly be seen from FIG. 2, the plenum chamber 11 is located inboard of the rear wheels 10 of the trailer 9 so that the wheels 10 are fully accessible. The "I" beams 23 sit above the wheel axles using a system of air bags 26 between the axles and the "I" beams 23. Thus the plenum chamber will extend for a suitable distance above the ground generally in a range from 25.4 cm (10 inches) to 45.72 cm (18 inches) but with a preferable distance of 35.56 cm (14 inches).

The plenum chamber 11 comprises a plenum roof platform 27 extending over the whole area of the plenum chamber 11 and is the same shape as the plenum chamber 11. The skirt 13 is continuous and unbroken around the entire periphery of the plenum chamber 11. One or more fans for providing the air supply to the plenum chamber 11 are mounted on the plenum roof platform, one of these being shown in FIG. 2 at 31. Usually there will be two fans, these being located spaced along the length of the plenum chamber. However, if desired, a single fan could be used situated at either end of the plenum chamber.

Figure 3:
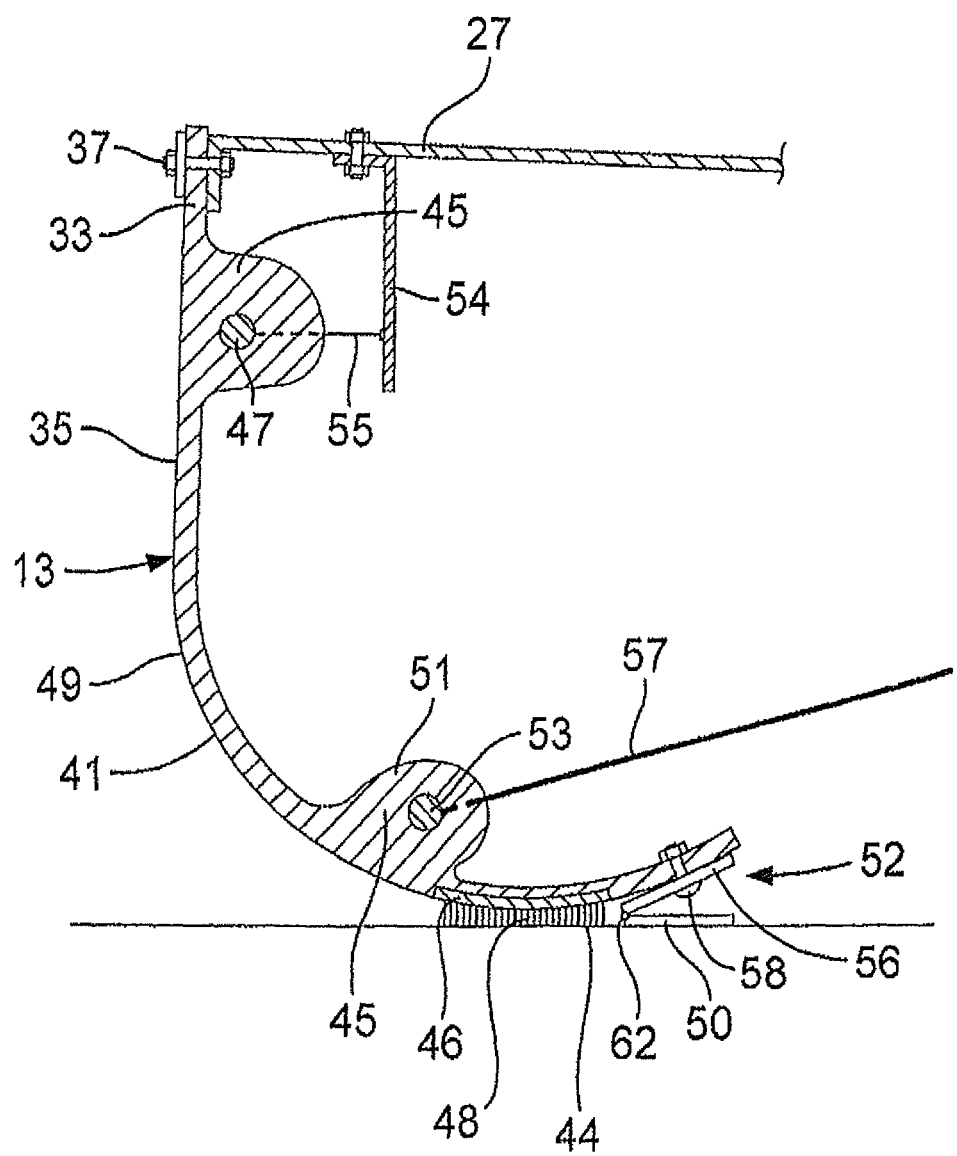
FIG. 3 is an enlarged sectional side view of the skirt showing details of its construction.

FIG. 3 shows the construction of the skirt 13 and its attachment to the plenum roof platform 27. As can be seen, the skirt 13 has a cross section shape of a "J" or a mirror image thereof depending on which direction it is being looked at. The upper part 33 of the straight leg 35 is attached to the edge of the plenum roof platform by a connecting arrangement 37 in the form of a fixing plate fastened to the chamber structure by nuts and bolts by means of which the skirt 13 makes an airtight seal with the plenum roof 27. The skirt 13 is preferably made from extruded polyurethane. Preferable values for this material are:

Hardness 90 Shore
Density 1,250 kg/m$^3$

The "U" part 41 of the "J" is the part of the skirt 13 which engages the ground surface 43 and is provided with ground engaging member in the form of a brush surface 44 and a sealing member 52 located inwards of the brush surface 44. This brush surface is designed to raise the bottom of the skirt from the ground surface. The brush surface 44 is formed on a base element 46 which is fastened to the base of the skirt by means, such as bolts, (not shown) and is detachable from the skirt to enable replacement of the brush surface 44 when worn. Suitably the base is slotted into an inset space on the underside of the skirt. The brush surface 44 comprises a large number of downwardly extending flexible bristles 48 formed suitably from PBT, Polyester, PVC or nylon with a thickness of between 0.7 and 1 mm.

The bristles 48 are of a length ranging from 20 to 30 mm (preferably 20 to 25 mm) and are angled backwards from the intended direction of travel of the load at an angle of inclination of the bristles 48 equal to or less than 30 degrees to the vertical, preferably between 15 and 25 degrees. A shock absorbent layer (also not shown) will normally be provided between the base element and the skirt surface to reduce wear.

The sealing member 52 comprises a sealing part 50 which is in engagement with the ground surface 43 and an attachment part 56 which is removably attached to the "U" part of the skirt, for example, by bolts 58 and to the sealing part 50 by a hinge 62 whose axis extends in the longitudinal direction of the skirt. The sealing part 50 is maintained in contact with the ground surface by the action of the hinge 62 and its weight to maintain a seal between the skirt and the ground surface with minimum force and friction to the ground. To this end, the sealing part may be made of a modified polyethylene such as that sold under the registered trademark TIVAR.

The skirt 13 basically comprises a top substantially rigid portion 33 which terminates in an inwardly extending strengthening rib 45 which extends longitudinally of the skirt 13. Inside of the strengthening rib 45 is provided a aperture, and a wire, rod or tube 47, suitably of steel, is provided therein. Sections of the rod 47 are suitably connected at their ends to provide a continuous rod which rod extends around the periphery of the plenum chamber 11. Below the strengthening rib 45 is a section 49 which is flexible and ends in a second strengthening rib 51 which also contains a strengthening wire rod or tube 53 also suitably of steel. The positions of the two strengthening ribs 45 and 51 are retained in position by anchoring lines 55 and 57 which, while permitting the skirt to move inwardly of the plenum chamber 11, prevents their movement outwards. These anchoring lines may comprise steel wire, steel chain or steel rods.

The anchoring lines 55 are anchored to plates 54 depending from the plenum roof 27 while the anchoring lines 57 are anchored at their other ends at 59 and 61 (see FIG. 2) to the plenum roof 27. The angle between the anchoring lines 55 and 57 and the straight leg 35 of the skirt 13 must lie at 90 degrees for the upper anchoring lime 55, and in the range of 10 to 50 degrees for the lower anchoring line 57, more preferably in the range of 10 to 40 degrees. For optimum results it has been determined that the best angle range for the lower anchoring line 57 is 20 to 30 degrees. The anchoring lines should be located at a spacing of no more than 1,000 mm but for maximum effect, this spacing should be reduced, for example, to 350 mm. With these anchor angles, a suitable positioning of the anchoring attachments and thus of the strengthening ribs is 18% down of the free depth of the skirt for the upper anchoring line 55 and 93% for the lower anchoring line 57.

As the vehicle travels along the road it will move up and down following the undulating terrain of the road surface. With the skirt constantly touching the road surface through the bristles 48, it will have to compensate for this movement so as to retain pressure in the plenum chamber. For this reason, the skirt has been designed as a "J" section so that the bottom of the "J" will roll round and the straight section above this will flex and keep the seal between the bristles 48 with the road surface constant, This also has the effect of reducing drag which would be created if the skirt was not able to flex.

It is important for a full satisfactory operation of the skirt and thus of the invention that the angles of the ties remain in these ranges. This will insure that air leakage is kept to a minimum so as to provide the desired lift to the vehicle with a minimum use of power to generate the necessary pressure in the plenum chamber.

Figure 4:
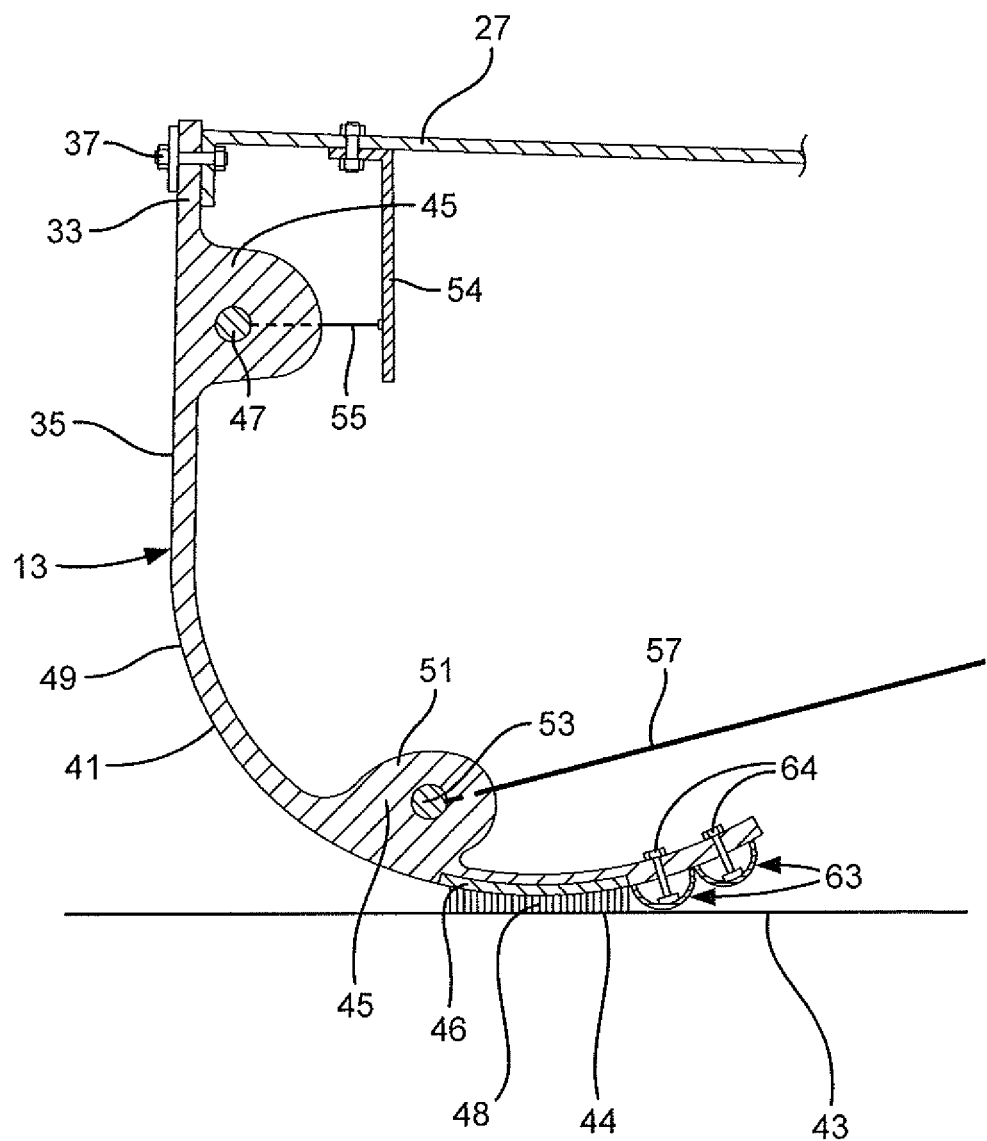
FIG. 4 is a view similar to FIG. 3 but showing a different sealing arrangement.

FIG. 4 shows a similar arrangement to that shown in FIG. 3 but provides for a different sealing arrangement 52. In this case two strips 63 of the modified polyethylene such as that sold under the registered trade mark TIVAR are removably attached to the "U" part of the skirt inboard of the bristles 48 by means of bolts 64, The strips 63 have a downwardly convex cross section which is intended to engage the road surface 43. The curvature of the strips reduces the friction between the sealing strips 63 and the road surface 43. Instead of being two sealing strips, the same shape can be achieved with a single extrusion moulding.

Figure 5:
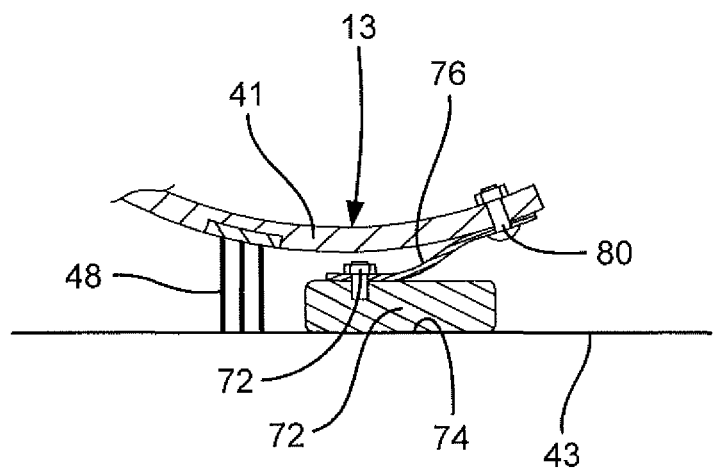
FIG. 5 is a fragmentary view of the bottom of the skirt but showing a still further form of sealing arrangement.

FIG. 5 is a fragmentary view of the lower part of the "U" shaped part 41 of the skirt 13 showing yet a further sealing arrangement. In this case a wear strip 72 of generally rectangular cross section with rounded corners is provided. The wear strip 72 engages the road surface 43 with one of its longer rectangular sides 74. The wear strip 72 is connected to the skirt by means of a spring bracket 76 which is attached at the end adjacent to the bristles 48 to the wear strip 72 by a bolt 78 and at its other end to the "U" shaped part 41 of the skirt 13 by a bolt 80.

Figure 6:
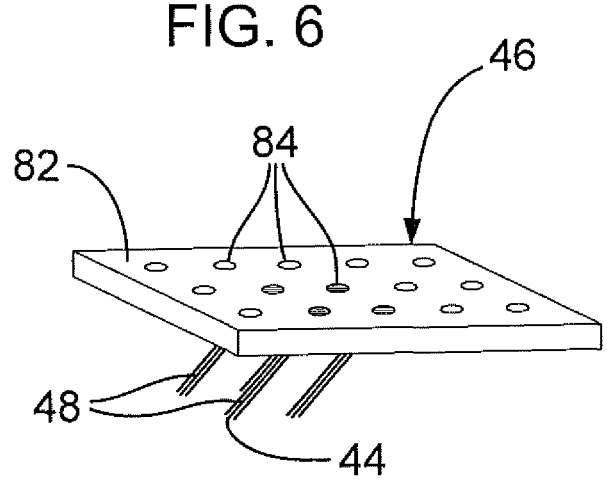
FIG. 6 is a fragmentary perspective view showing the construction of the bristle holder.

FIG. 6 is a fragmentary perspective view showing the construction of the brush surface 44. As shown, a holder 46 for the bristles 48 comprises a PVC strip 82, suitably of 5 to 7 cm in width, having a number of apertures 84 for receiving the bristles 48. Suitably there may be five apertures 84 across the strip with the apertures being spaced apart by 0.5 cm. The apertures are intended to receive 6 to 10 bristles 48 in each aperture 84. The apertures 84 are inclined backwardly to the direction of travel of the skirt so that the bristles extend at an angle of less than or equal to thirty degrees, preferably between fifteen and twenty five degrees, to the vertical and are arranged so that they effectively trail in the direction of travel of the skirt. The bristles are suitably made of PBT, Polyester, PVC or nylon with a thickness of between 0.7 and 1 mm. The length of the bristles is suitably between 20 and 30 mm, preferably between 20 and 25 mm.

In addition to or instead of providing the bristle arrangement for supporting the skirt, support for the skirt may also be provided by wheels, rollers or the like. The use of wheels, rollers or the like for supporting the skirt will enable there to be less friction between the skirt and the ground surface while still maintaining a seal by the use of the wear strip. Where wheels are used, these may be attached to a suitable part of the skirt either inside or outside the skirt. The wheels would be provided at spaced distances around the skirt and may, if required, be castored to follow the direction of movement of the skirt. Where rollers are used, these may be located directly under the "U" shaped part of the skirt.

FIGS. 7 to 9 show how the skirt 13 is made up of a number of sections 71 which are connected together and sealed along the lines 73. The ends of the moulded sections have a moulded shape such that a shaped rib 74 at one end of a moulded section fits into a shaped groove 76 in the end of the adjacent section, the seal being completed by an adhesive (FIG. 7). The rods 47 and 53 are also provided in sections 75 and these are all connected together as at 77 so as to form a completely continuous rod around the entire periphery of the plenum chamber 11.

FIG. 10 is a plan view of one embodiment of the skirt 13 from which it can be seen that the skirt has two parallel sides 61 and 63 on opposite sides of the vehicle, these two sides being connected together by "U" shaped ends 65. In FIG. 11 is shown a second embodiment with pointed or aerodynamic ends 69 having an apex angle of between 60 and 160 degrees, preferably 67 degrees. All of the elements 61 to 65 or 67 are connected together to form a continuous skirt, it will be appreciated that the pointed ends provide for an increased area for the action of the air cushion and also provide an aerodynamic construction reducing the drag caused by the skirt 13 touching the road surface through bristles 48.

With the construction as described above. the amount of pressure needed inside the plenum chamber can be of the order of 1 to 2 pounds per square inch. This will supply, with a suitable area of plenum roof 27, a lifting power of 20 tons. Thus a relatively low power of fans will be required to provide an appropriate lift. Such fans could be for example a single fan of 30 kilowatts. Suitably, the fans would driven by generators driven by the road wheels.

Figure 12:
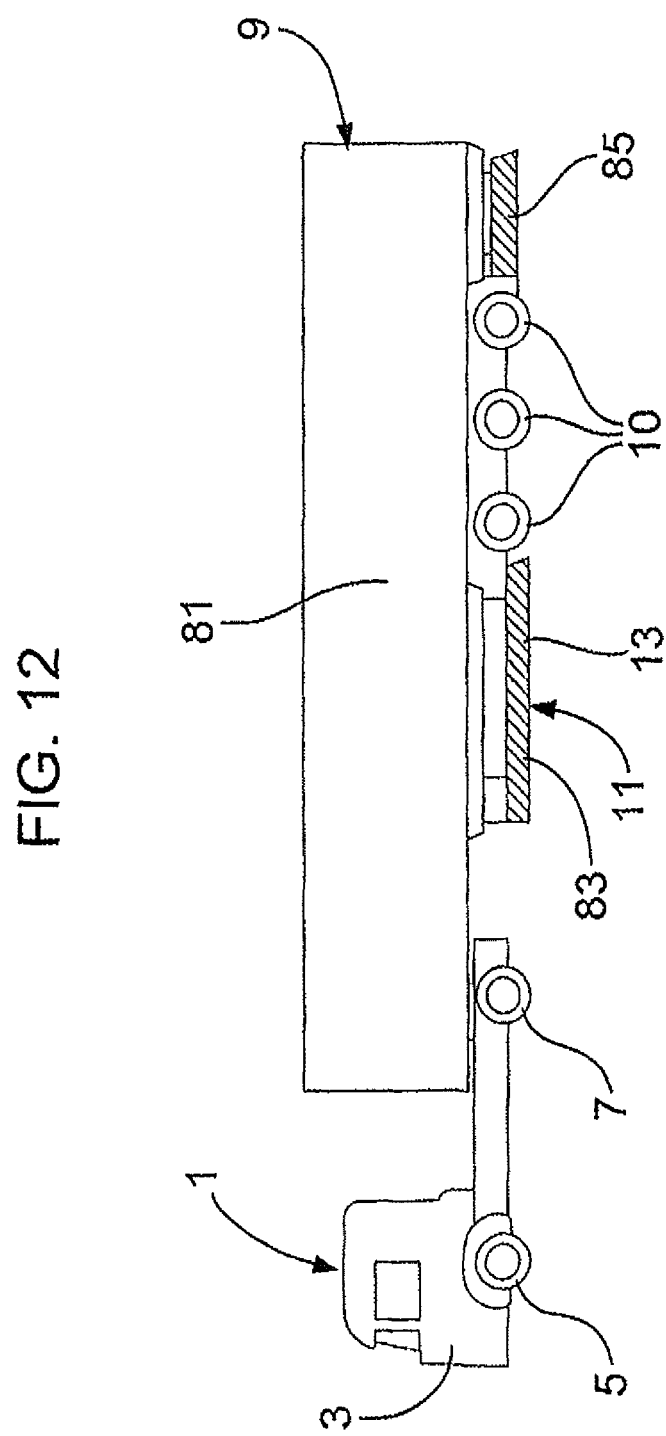
FIG. 12 is a general schematic side view of a vehicle in accordance with a second embodiment of the invention.

While the above described arrangements call for a single plenum chamber which extends substantially the length of the trailer, different arrangements can be used. For example, FIG. 12 shows an arrangement with a trailer 81 having two plenum chambers 83 and 85, one in front and one behind the six wheels 10.

It will be appreciated that various modifications of or additions to the above described embodiments may be made without departing from the scope of the invention. For example, while it is considered that two anchoring lines provide optimum support for the skirt, if desired, three or more anchoring lines could be used. The materials for the ties and the strengthening elements in skirt ribs may be varied, for example, in suitable situations, plastics of suitable strength and characteristics could be used. While two strengthening ribs have been shown, more strengthening ribs could be used as seems suitable to a particular application.

In certain circumstances, it may be desirable that, instead of locating the skirt inside of the wheels, it could be located outside the wheels, leaving the wheels located in the plenum chamber.

In addition to the air supply provided by the fan, additional air can be provided using a ram air intake facing forwards above the cab unit.

In another possible modification, the plenum chamber could be constructed to be readily removable so that it could be transferred from one vehicle to another.

It will further be noted that while the invention has been described in connection with a semitrailer, it could also be applied to both full trailers and articulated or other types of lorries. It could also be used on other land vehicles such as trains, coaches or buses.

What is claimed as new and desired to be protected by Letters Patent of the United States is:

1. A ground effect transport system comprising a plenum roof platform adapted for location beneath a load carrying means, a skirt depending from said platform to form a plenum chamber with the platform and defining a bottom of the skirt at a lower part of the skirt, fan means on or in the platform intended to supply air to said plenum chamber, wherein said skirt extends downwardly towards the ground surface and has a ground engaging support member to support said bottom of said skirt above the ground surface and a separate detachable sealing member attached directly to said bottom of said skirt to provide a seal directly between said bottom of said skirt and the ground surface.

2. A system as claimed in claim 1, wherein said detachable sealing member is located at an inner side of said support member.

3. A system as claimed in claim 2, wherein said detachable sealing member comprises a sealing part in contact with the ground surface and an attachment part detachably attached to said skirt and attached to said sealing part by a hinge comprising an axis which extends in a longitudinal direction of said skirt.

4. A system as claimed in claim 1, wherein said ground engaging support member comprises a brush surface.

5. A system as claimed in claim 4, wherein said brush surface is formed on a base element which is fastened to said bottom of said skirt.

6. A system as claimed in claim 5, wherein said base element is detachable from said skirt to enable replacement of said brush surface when said brush surface becomes worn.

7. A system as claimed in claims 4, wherein said brush surface comprises a large number of downwardly extending flexible bristles.

8. A system as claimed in claim 7, wherein said bristles comprise a material taken from the list consisting of PBT. Polyester, PVC or nylon.

9. A system as claimed in claim 7, wherein said bristles are of a length ranging from 20 to 30 mm.

10. A system as claimed in claim 7, wherein said bristles are angled backwards from the intended direction of travel of the load.

11. A system as claimed in claim 10, wherein said angle of inclination of said bristles is equal to or less than 30 degrees to the vertical.

12. A ground effect transport system comprising a plenum roof platform adapted for location beneath a load carrying means, a skirt depending from said platform to form a plenum chamber with the platform and defining a bottom of the skirt at a lower part of the skirt, fan means on or in the platform intended to supply air to said plenum chamber, wherein said skirt extends downwardly towards the ground surface and has a ground engaging support member to support said bottom of said skirt above the ground surface and a separate detachable sealing member attached directly to said bottom of said skirt and located at an inner side of said support member to provide a seal directly between said bottom of said skirt and the ground surface, said sealing member comprising a sealing part in contact with the ground surface and an attachment part detachably attached to said skirt and attached to said sealing part by a hinge comprising an axis which extends in a longitudinal direction of said skirt.

13. A system as claimed in claim 12, wherein said ground engaging support member comprises a brush surface.

14. A system as claimed in claim 13, wherein said brush surface is formed on a base element which is fastened to said bottom of said skirt.

15. A system as claimed in claim 14, wherein said base element is detachable from said skirt to enable replacement of said brush surface when said brush surface becomes worn.

16. A ground effect transport system comprising a plenum roof platform adapted for location beneath a load carrying means, a skirt depending from said platform to form a plenum chamber with the platform and defining a bottom of the skirt at a lower part of the skirt, fan means on or in the platform intended to supply air to said plenum chamber, wherein said skirt extends downwardly towards the ground surface and has a ground engaging support member to support said bottom of said skirt above the ground surface and a separate detachable sealing member attached directly to said bottom of said skirt to provide a seal directly between said bottom of said skirt and the ground surface, said ground engaging support member comprising a brush surface and a base element on which said brush surface is formed which is detachably fastened to said bottom of said skirt to enable replacement of said brush surface when said brush surface becomes worn.

17. A system as claimed in claim 16, wherein said brush surface comprises a large number of downwardly extending flexible bristles.

18. A system as claimed in claim 17, wherein said bristles comprise a material taken from the list consisting of PBT. Polyester, PVC or nylon.

19. A system as claimed in claims 18, wherein said bristles are angled backwards from the intended direction of travel of the load.

20. A system as claimed in claim 19, wherein said angle of inclination of said bristles is equal to or less than 30 degrees to the vertical.

21. A system as claimed in claim 17, wherein said bristles are of a length ranging from 20 to 30 mm.

* * * * *